Feb. 18, 1947.　　　D. G. C. LUCK　　　2,415,954
RADIO DIRECTION FINDING
Filed Feb. 28, 1942
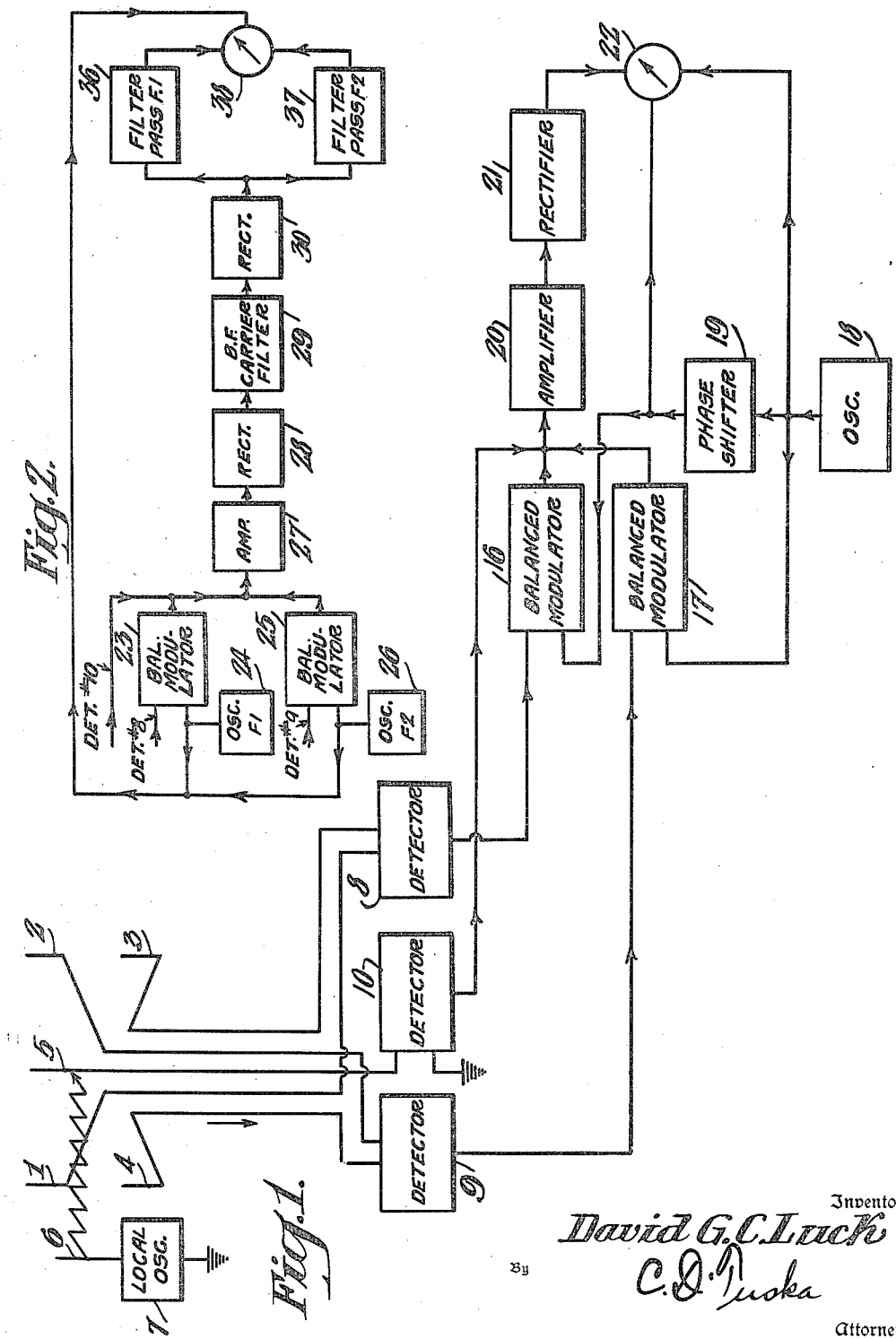
Inventor
David G. C. Luck
By C. D. Tuska
Attorney Patented Feb. 18, 1947

2,415,954

UNITED STATES PATENT OFFICE 2,415,954

RADIO DIRECTION FINDING

David G. C. Luck, Merchantville, N. J., assignor to Radio Corporation of America, a corporation of Delaware Application February 28, 1942, Serial No. 432,840

2 Claims. (Cl. 250—11)

1

This invention relates to radio direction finding, and more particularly to direction finders of the direct indicating type employing a stationary antenna array and a local oscillator for obtaining beat-frequency voltages by radiation injection, with consequent freedom from inaccuracies due to radio frequency phase shifts in the antenna circuits.

Direction finders which are free from errors due to obliquity of incidence and polarization of received waves usually operate by comparing the radio frequency phases of the waves upon arrival at each of a plurality of spaced antennas. Phase difference variations between the voltages on each pair of antennas are converted to amplitude variations by connecting the antennas of each pair in bucking relation. Because the currents induced in each antenna pair must flow in a separate set of circuits, to maintain their identities for measurement, such systems are very critical to circuit adjustments and their consequent phase variations. By setting up a radiating local oscillator in the vicinity of the antenna system and tuning it to emit a frequency adjacent to that of a signal of which the direction of arrvial is to be determined, the phases of local and distant signals will be affected similarly by antenna circuit impedance variations, so that the phases of the beat notes derivable from each antenna output by rectification will be unaffected by radio frequency tuning and these beat note phases may be compared to determine the relative directions of the distant and local signal sources. To provide a direction indication, previously known forms of this system have required several complete receivers.

The principal object of the present invention is to provide a system of the above-described type requiring only a single receiver or amplifier-rectifier combination. This is accomplished by, in effect, using the receiver successively in connection with several antennas by a switching procedure.

The invention will be described by referring to the accompanying drawing, of which Fig. 1 is a block schematic circuit diagram of one form of the direction finder of the invention, and Fig. 2 is a diagram of a modification of the device shown in Fig. 1.

Referring to Fig. 1, four vertically disposed antennas 1, 2, 3 and 4 are arranged at the corners of an imaginary square, equidistant from another vertical antenna, 5. One pair of diagonally opposite antennas 1 and 3 are connected in bucking relation with each other to a detector 8; the other pair of diagonally disposed antennas 2 and 4 are similarly connected to a detector 9. The bucking connection of the opposed antennas of each pair causes variations in the phase relationship between the voltages induced in the two antennas to be converted into variations in amplitude of the resultant output voltage of the pair. The centrally located antenna 5 is connected to a detector 10. An additional antenna 6 is located a short distance away from the above-described array, along a line bisecting one of the angles formed by two adjacent outer antennas and the central antenna, and is fed by a local oscillator 7, at a frequency somewhat different from that of the signal of which the direction of arrival is to be determined. When a signal is received from a distant source, the outputs of the detectors 8, 9 and 10 will include beat frequency products of a frequency equal to the difference between the frequency of the local oscillator and that of the distant source. The amplitudes of the beat frequency voltages appearing in the outputs of detectors 8 and 9 will be proportional, respectively, to the cosine and to the sine of the azimuth of the distant signal, and the amplitude of the beat frequency voltage in the output of detector 10 will be independent of the azimuth.

These beat frequency voltages are all in phase, and the information as to the azimuth of the arriving signal is obtainable by comparing their amplitudes. This may be done by applying the cosine-proportional and the sine-proportional voltages to the respective rectangularly related field coils of a phase meter, and energizing the rotor coil with the beat voltage derived from the non-directional antenna; or the cosine-proportional and sine-proportional voltages may be applied to the deflecting plates of a cathode ray tube, and the third voltage used to broaden or cut off one end of the luminous trace by defocusing the beam, in order to indicate the sense. A great disadvantage in either of these methods of obtaining a direct indication is the necessity of three separate amplifiers, one for each beat frequency voltage; the gains of two of the amplifiers must be maintained in a constant ratio, or the indications will be inaccurate. It would be very inconvenient to maintain the ratio of the gains constant by manual control, and any automatic gain control means which would maintain the necessary relationships with sufficient accuracy is likely to be complicated and cumbersome.

In the system of the invention, the cosine-proportional and sine-proportional beat frequency voltages from the detectors 8 and 9, respectively, are fed to balanced modulators 16 and 17, where they are modulated with the cosine and sine, respectively, of a relatively low frequency voltage generated by an oscillator 18. The cosine and sine relationship of the modulating voltages is obtained by applying the output of the oscillator 18 directly to the balanced modulator 17, and through a 90° phase shifting device 19 to the modulator 16. The outputs of the balanced modulators are added together and applied to an amplifier 20, and thence to a rectifier 21. The significant component in the output of the rectifier 21 is a voltage alternating at double the frequency of the oscillator 18 and varying in its phase angle with respect to the voltage of oscillator 18 in accordance with cosine-proportional and sine-proportional voltages applied to the modulators 16 and 17 from the detectors 8 and 9. The output of the detector 10 is added to the outputs of the modulators 16 and 17 ahead of the amplifier 20 and the rectifier 21 to provide an azimuth independent beat frequency carrier for the side-bands from the balanced modulators, and this results in a voltage in the output of rectifier 21 having the same frequency as the oscillator 18, and related in its phase with the oscillator voltage by an angle equal to the azimuth of the wave arriving at the antennas. This phase angle is measured by a phase indicator 22, which is connected to the output of the rectifier 21, and to the oscillator 18 and the phase shifter 19 for reference voltages.

The phase indicator 22 may be a Selsyn type meter, with rectangularly disposed field coils energized by the sine and cosine voltages from the oscillator 18 and phase shifter 19, and a rotatable armature coil connected to the rectifier 21. The armature of such a device will align itself in an equilibrium position dependent upon the relative phases of the voltages applied to the instrument.

Referring to Fig. 2 of the drawing, the cosine-proportional beat voltage from detector 8 is modulated at a relatively low frequency $F_1$ by means of a balanced modulator 23 and an oscillator 24. The sine-proportional beat voltage from the detector 9 is similarly modulated by a modulator 25 and an oscillator 26 at another low frequency $F_2$. The modulation products are added to a beat frequency carrier from the detector 10 and amplified, rectified, and filtered to produce a beat voltage modulated at frequencies $F_1$ and $F_2$, which is in turn rectified to permit separate recovery of the two modulation frequencies by wave filters 36 and 37. The two modulation voltages are proportional in amplitude to the cosine and the sine, respectively, of the azimuth, and are compared by means of a meter 38 to give a direct bearing indication.

The azimuth independent beat frequency carrier from the detector 10 is added to the outputs of the balanced modulators 23 and 25 in the same manner as in Fig. 1 and the voltages of oscillators 24 and 26 are added together and applied to the meter 38 in order to give sense to the bearing indications.

I claim as my invention:

1. A radio direction finder including an Adcock array of spaced stationary antennas, a local radiation source coupled to said array, and a plurality of detectors, one connected to each diagonally related pair of the antennas of said array, and one connected to a control antenna thereof, so as to derive from a wave of which the direction of arrival is to be determined, beat frequency voltages having amplitudes respectively proportional to the cosine and the sine of the angle of said direction of arrival with respect to a reference line, and a beat frequency voltage having an amplitude independent of the angle of said direction of arrival; means for interpreting said beat frequency voltages in terms of an angle including an auxiliary oscillator and two balanced modulators controlled by said oscillator and connected to said diagonally related antenna pairs to modulate said cosine and sine proportional beat frequency voltages with the cosine and sine respectively of the wave generated by said auxiliary oscillator, means for amplifying and rectifying the sum of the products of said modulators and said directionally-independent beat frequency voltage, and a phase indicator connected to respond to the phase angle between the wave generated by said auxiliary oscillator and said amplified and rectified sum voltage.

2. A radio direction finder including an Adcock array of spaced stationary antennas, a local radiation source coupled to said array, and a plurality of detectors, one connected to each diagonally related pair of the antennas of said array, and one connected to a central antenna thereof, so as to derive, from a wave of which the direction of arrival is to be determined, beat frequency voltages having amplitudes respectively proportional to the cosine and the sine of the angle of said direction of arrival with respect to a reference line, and a beat frequency voltage having an amplitude independent of the angle of said direction of arrival; means for interpreting said beat frequency voltages in terms of an angle including balanced modulators, one connected to each of said antenna pairs, and differing auxiliary control voltage sources connected to said modulators to modulate said cosine and sine proportional beat frequency voltages differently, means for amplifying and rectifying the sum of the products of said modulators and said directionally-independent beat frequency voltage, and a meter connected to compare said amplified and rectified sum voltage with said auxiliary control voltages.

DAVID G. C. LUCK.

REFERENCES CITED

The following references are of record in the file of this patent:

UNITED STATES PATENTS

| Number | Name | Date |
|---|---|---|
| 2,156,297 | Kruesi | May 2, 1939 |
| 2,213,273 | Earp | Sept. 3, 1940 |
| 2,208,378 | Luck | July 16, 1940 |
| 2,083,495 | Black et al. | June 8, 1937 |
| 2,213,874 | Wagstaffe | Sept. 3, 1940 |
| 2,274,546 | Hugenholtz | Feb. 24, 1942 |
| 2,314,093 | Landon | Mar. 16, 1943 |

OTHER REFERENCES

Proceedings of the IRE, May 1928, vol. 16, No. 5, pages 658–661.